United States Patent [19]

Fagerlund

[11] Patent Number: 4,668,541
[45] Date of Patent: May 26, 1987

[54] CORROSION-PROOF CONCRETE

[75] Inventor: Göran Fagerlund, Vallentuna, Sweden

[73] Assignee: Cementa AB, Danderyd, Sweden

[21] Appl. No.: 843,661

[22] Filed: Mar. 25, 1986

[51] Int. Cl.[4] .............................................. B05D 7/24
[52] U.S. Cl. .............................. 427/397.7; 427/427; 427/403; 427/140
[58] Field of Search ................ 427/397.7, 427, 403, 427/140, 142

[56] References Cited

U.S. PATENT DOCUMENTS

| | | | |
|---|---|---|---|
| 2,770,560 | 11/1956 | Hobson | 427/427 |
| 3,002,843 | 10/1961 | Stocker. | |
| 4,198,450 | 4/1980 | Hooykaas | 427/427 |
| 4,239,397 | 12/1980 | Sandell et al. | 427/427 |
| 4,292,351 | 9/1981 | Ito et al. | 427/427 |
| 4,310,486 | 1/1982 | Cornwell et al. | 427/427 |
| 4,536,417 | 8/1985 | Shimizu | 427/427 |
| 4,609,573 | 9/1986 | Omata et al. | 427/403 |

FOREIGN PATENT DOCUMENTS 302911 8/1968 Sweden.

Primary Examiner—Shrive P. Beck
Attorney, Agent, or Firm—Young & Thompson

[57] ABSTRACT

Salt damage to concrete structures as a result of contact with dry salt, sea water or like salt environments can be avoided in the case of new structures and repaired in the case of damaged structures by applying a layer of slag cement concrete to the structures. The ability of slag cement to absorb chlorides and to delay chloride penetration greatly lengthens the time required to initiate corrosion of the reinforcing irons by the chlorides present and to reduce the effect of chlorides in conjunction with frost. The slag cement-concrete also has a leaching effect on chloride-infected structures and in the case, for example, of an old bridge pier having applied thereto a layer of slag cement-concrete the carbonation front is halted and a new front is formed in the protective layer. The chloride profile extending through the pier is also changed as a result of chloride irons diffusing out from the infected concrete and being neutralized in the protective layer. The slag cement can also be applied to form a salt-frost resistant layer by spray casting techniques, this being difficult to achieve with conventional shotcrete base on other types of cements.

2 Claims, 11 Drawing Figures

CORROSION-PROOF CONCRETE

Concrete structures are subjected to high degrees of strain in corrosive environments and are found to become particularly impaired when exposed to the influence of road salt and sea water. Chlorine-ions diffuse into the concrete and erode the reinforcement irons to such an extent that it is often necessary to carry out expensive repair work within the space of as little as ten years from the time of the structure becoming operational. It is also difficult to carry out long-lasting, durable repair work on concrete structures which have been damaged in this way. The difficulties involved in this respect are both of a practical and a technical nature with regard to the material used. The materials used to repair the damaged structure often only afford limited protection and are in themselves less durable than could be desired, in addition to which the work of carrying out such repairs is both labour intensive and time consuming. Repair work to bridge constructions are particularly difficult to carry out, due to the nature of the formworks required in connection therewith. It is true that such repair work can be greatly facilitated by using shotcrete or sprayed concrete, but such concrete is sensitive to frost and therewith of suspect durability.

The object of the invention is to simplify and to improve repairs to damaged concrete, and to produce initially structures which are much stronger and far more resistant to corrosion than earlier structures.

The invention will now be described in more detail with reference to the accompanying drawings, in which FIG. 1 is a sectional view of a parking apron or hard-standing;

FIG. 2 is a sectional view of a parking apron incorporating a protective layer or coating of slag cement-concrete in accordance with the invention;

FIGS. 3A–E illustrate various concrete structures protected in accordance with the invention;

Slag cement-concrete based on a slag cement comprising 65% by weight ground, granulated blast furnace slag has an extremely high chloride absorption ability, which means that the effective chloride diffusion coefficient is much lower than that for Portland cement-concrete of the same water-cement ratio (WCR). It is even lower than that of concrete containing silica dust or fly ash.

We have determined the diffusion coefficient for chloride diffusion with the aid of cement pastes produced with binders containing various mixtures of Portland cement and certain mineral additives. The pastes were stored for 65 days in a saturated $Ca(OH)_2$-solution prior to making the tests.

| Type of cement | $D_{eff} \times 10^8$, (cm²s) | |
|---|---|---|
| | vbt = 0.04 | vbt = 0.60 |
| 100% PC | 2.08 | 9.98 |
| 95% PC* + 5% FA | 1.68 | 8.08 |
| 85% PC* + 15% FA | 1.25 | 8.19 |
| 65% PC* + 35% FA | 0.30 | 2.45 |

-continued

| Type of cement | $D_{eff} \times 10^8$, (cm²s) | |
|---|---|---|
| | vbt = 0.04 | vbt = 0.60 |
| 90% PC** + 10% S | 3.02 | 12.22 |
| 35% PC** + 65% MS | 0.11 | 0.97 |

*The specific surface of the cement was increased in a manner to provide the same 28-day strength factor as that obtained with solely PC.
**The cement has a standard surface area.
Percentages are given in percent by weight.
PC = Portland cement
FA = flyash
S = silica dust
MS = granulated ground blast furnace slag (slag cement)
$vbt = \frac{V}{PC + FA}$ resp. $\frac{V}{PC + S}$ resp. $\frac{V}{PC + MS}$ The high diffusion coefficients with respect to concrete comprising silica dust are particularly surprising.

Measurements taken of the diffusion of chlorine through concrete have shown that diffusivity decreases with increasing slag contents, in accordance with equation $$D = D_0/(1 + a \cdot S^6)$$

where $D_0$ is the diffusivity in respect of PC, S is the slag content, and $a$ is a constant.

Figure 1:
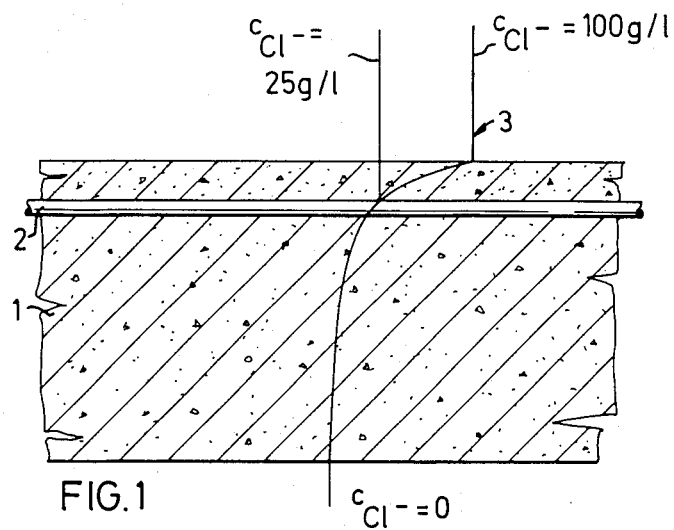

By spraying layers of slag cement-concrete onto concrete structures exposed to salt environments, for example such structures as bridge decks, edge beams, parking aprons, quay decks, quay piers, or pillars, bridge piers or pillars, etc., there is obtained effective protection against the penetration of chlorides to the reinforcing irons, a protection which is far more effective than that afforded by the silane-containing hydrophobic substances used at present, the long-term effect of which substances has still to be established. It is not convenient to cast reinforcing irons directly in slag concrete, however, since the sulphur present in the slag may, in some instances, result in corrosion of the irons. Consequently, a layer of Portland cement should always be applied between the reinforcing iron and the slag concrete. FIG. 1 illustrates a parking apron in which reinforcing irons 2 lie 30 mm beneath the concrete surface of a 200 mm thick cast-concrete layer 1 comprising solely Portland cement. The water-cement ratio of the structural concrete is assumed to be 0.40, i.e. the concrete is a high grade concrete. The chloride concentration above the deck or floor structure has been assumed to be 100 g/l, which, although extremely high, corresponds to the effect produced by dry salt. By way of comparison it can be mentioned that water from the Atlantic Ocean has a chloride concentration of 19 g/l. The threshold value at which the chloride concentration initiates corrosion of the reinforcing irons is placed at 26 g/l, this concentration being reached when the structure is t years old. The chloride profile 3 then corresponds to that illustrated in the Figure. The time t can be derived from the diffusion equation. The concentration potential is $$\frac{100 - 25}{100 - 0} = 0.75$$

which at a relative depth of 3/20 = 0.15 corresponds to Fourier number $F_0 = 0.01$, i.e.

$$F_O = \frac{D_{\mathit{eff}}(\text{cm}^2/\text{s}) \; t \; (s)}{20^2 \; (\text{cm}^2)} \; 0.01$$

According to the aforegoing $D_{\mathit{eff}}$ in the case of Portland cement-concrete $= 2.08 \times 10^{-8}$ cm²/s, i.e. the time t is $$t = \frac{0.01 \cdot 20^2}{2.08 \cdot 10^{-8}} = 1.9 \cdot 10^8 \; S = 6 \text{ years}$$

The time t is assumed to be roughly the same even when the undersurface is assumed to be salted to the same concentration.

Thus, the reinforcing irons would begin to rust after being continuously exposed to salt for 6 years.

The Swedish Concrete Regulations, however, permit a water-cement ratio of 0.50. The diffusion coefficient is then approximately $4.9 \times 10^{-8}$ cm²/s ($D = a.vct^b$). The age at which corrosion is initiated then drops to about 2.5 years. These times are in good accord with those experienced in practice with concrete structures based on Portland cement and located in environments heavily contaminated with chloride.

Figure 2:
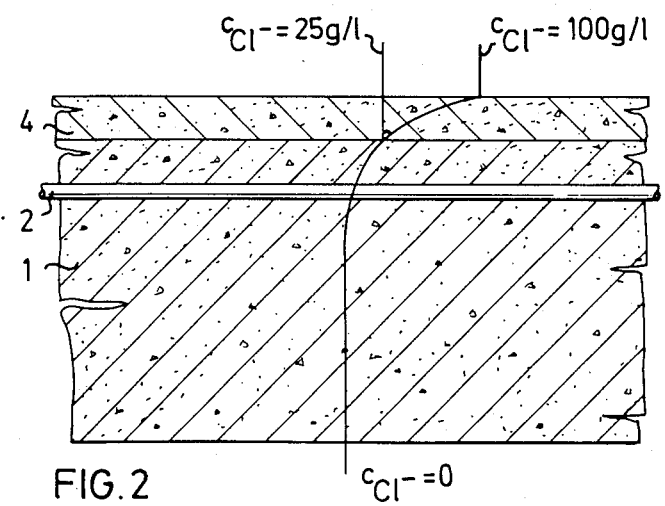
Figure 3A:
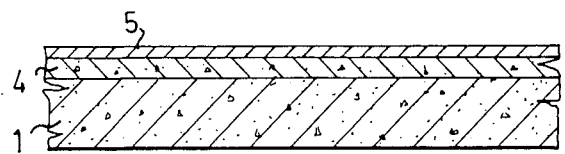
Figure 3B:
Figure 3C:
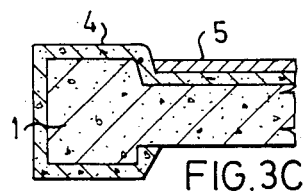
Figure 3D:
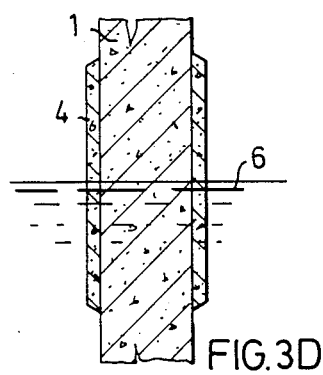
Figure 3E:
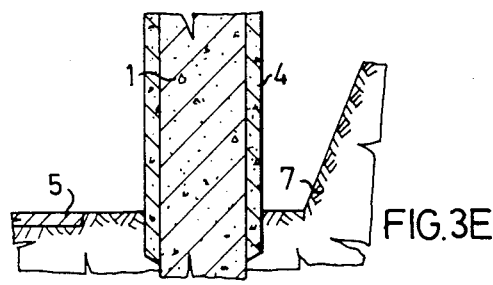

The procedure undertaken when coating the parking apron with an approximately 30 mm thick layer of slag cement-concrete is illustrated in FIG. 2. The time taken to initiate corrosion is then extended considerably, due to the low diffusion coefficient. This new initiation time can be precisely calculated by solving the diffusion equation, although an approximative assessment shows that solely the time taken to reach the chloride concentration of 25 g/l at the interface or boundary layer between slag cement-concrete and structural concrete is about $$0.01 \times 20^2 \; 30.11 \times 10^{-8} \; (s) = 115 \text{ years}.$$

The time taken to reach this concentration at the level of the reinforcing irons is even longer. A 30 mm thick coating of Portland cement-concrete having a water-cement ratio of 0.40 would result in an initiating time of about 15 years, as compared with 6 years in the absence of such a coating, i.e. the coating has a marginal effect in this case.

A coating of slag cement-concrete having a thickness of only 20 mm will still result in an initiation time of at least 60 years.

FIG. 3 illustrates a number of applications of the invention in conjunction with new structures or with repairs to old structures. FIG. 3a is a sectional view of a bridge deck or quay deck. The cast concrete structure 1 is coated with a layer of frost-resistant slag cement-concrete, which is topped with a conventional layer of asphalt 5. FIG. 3b illustrates a parking apron which lacks an asphalt layer, and FIG. 3e illustrates an edge beam. FIG. 3d illustrates schematically a concrete bridge pier 1 which is coated with slag cement-concrete above and below the water line 6. Similarly, a viaduct pier is protected above and beneath the surface 7 of the roadway. It is assumed in all of the illustrated cases that the reinforcing irons have been placed in the Portland cement-concrete located inwardly of the slag cement-concrete.

A further, important advantage afforded by slag cement-concrete is that it is highly resistant to frost in the presence of dry salts. Although the protective layer or coating can also be applied without difficulty, for example, to the slabs illustrated in FIGS. 3a and 3b, matters are somewhat different when the protective layer is to be applied to the vertical surfaces of, for example, an older construction where the salt concentration has begun to reach dangerous levels, or, for example, to a repaired bridge edge-beam. The provision of a completely new framework is both time consuming and expensive. Although shotcrete or sprayed concrete affords a highly rational solution to the problem, conventional sprayed Portland cement-concrete is not normally salt-frost resistant. It has been found, however, that slag cement-concrete having a slag content of 65% or thereabove is adequately salt-frost resistant, even when shot-cast.

The salt-frost resistance can be determined by sawing slabs from the upper and lower ends of a concrete cylinder and bringing the sawn concrete surfaces into contact with a 3%-sodium chloride solution and, during a cycle of one calendar day, first cooling the surfaces from a temperature of $+15°$ C. to $-15°$ C. over a period of 16 hours, and then re-heating the surfaces for 8 hours to $+15°$ C. Subsequent to repeating this cycle a number of times, spalling, or flaking, is determined in kg/m² or mm spalling depth. The test methodology applied is described in detail in Swedish Standards SS 127 225.

Figure 4:
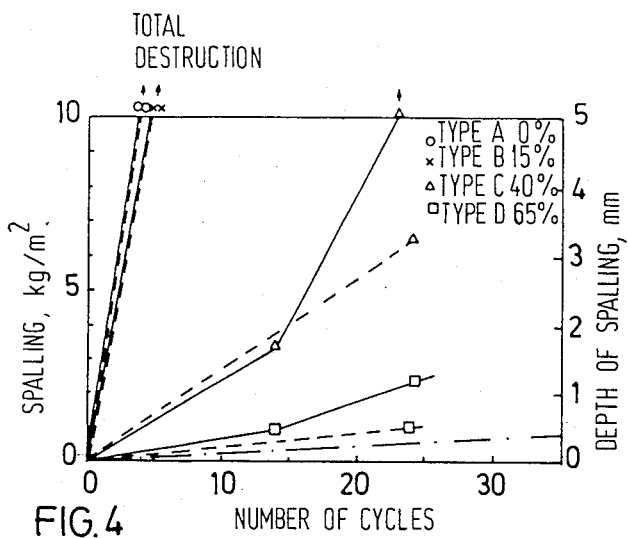
FIG. 4 illustrates the spalling of airfree concrete.
Figure 5:
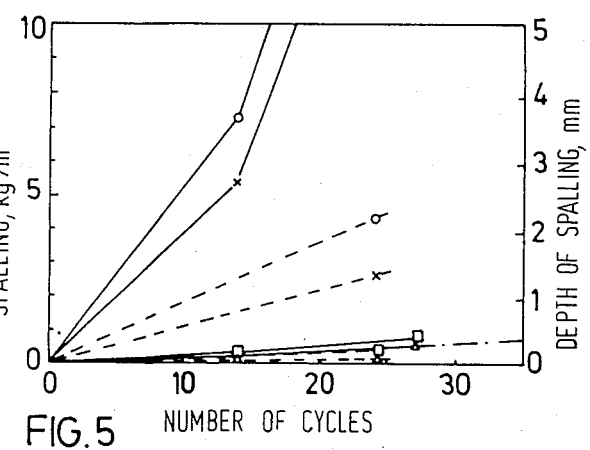
FIG. 5 illustrates the spalling of concrete containing 4.2–4.5% air.

FIGS. 4 and 5 illustrate the results obtained with concrete test pieces in the absence of air admixtures, and with test pieces which include 4.2–4.5% air, and with cement having a slag content of 0, 15, 40 and 65%.

The test samples comprising cement which contained 65% slag exhibited by far the greatest resistance to frost. Concrete comprising solely Portland cement and cement with a 15% slag content with no air inclusions, on the other hand, were found to be totally destroyed after only 3 cycles. The frost resistance was improved with 4.2–4.5% air admixtures, and test samples which comprised cement containing 15% slag could only withstand about 15 cycles, whereas concrete which comprised cement with higher slag content showed only slight signs of damage after 25–30 cycles.

It is extremely difficult to apply the air-admixture technique with shotcrete, or sprayed concrete, in practice. Consequently, finished shotcrete based on conventional cement does not contain sufficient air to render it resistant to frost in a salt environment. In this regard, slag cement which has a high slag content possesses the important attribute of completely inhibiting stresses due to salt, even when salt is present in large quantities, without additional admixtures of air in the concrete.

Figure 6:
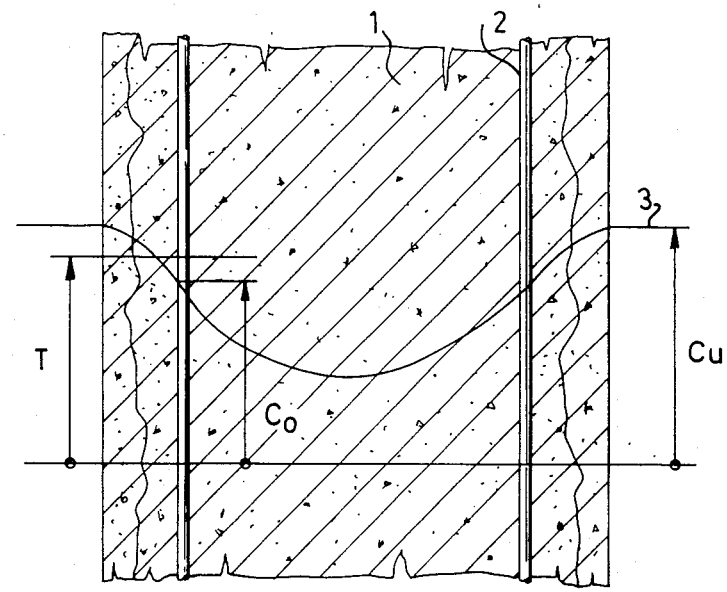
FIG. 6 is a sectional view of a damaged bridge pier.
Figure 7:
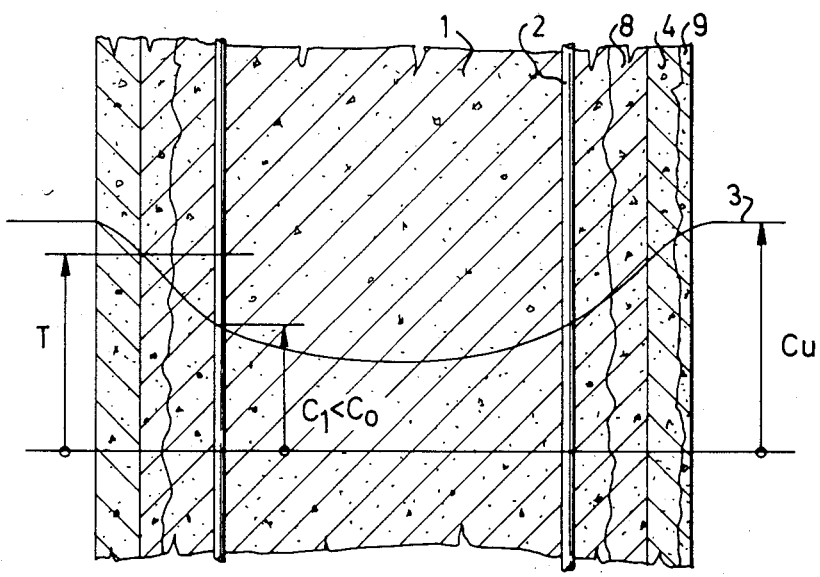
FIG. 7 is a sectional view of a bridge pier cast in accordance with the invention.

Concrete which is already damaged and infected with chloride is also reconstructed in a favourable manner when coated with concrete based on slag cement having a high slag content. FIG. 6 illustrates a corroded bridge pier, while FIG. 7 illustrates the same pier subsequent to coating it with slag cement-concrete. The curve 3, chloride concentration, illustrates the improvement obtained and shows how the concentration of chloride at the level of the reinforcing irons 2 falls from $C_0$ at the applied coating or layer to a lower value $C_1$ which lies beneath the threshold level T for corrosion of the reinforcing irons. $C_u$ designates the chloride concentration of the ambient environment. The earlier carbonation front 8 is arrested and remains unchanged, although a new carbonation front 9 is formed in the layer or coating. This also delays corrosion initiation caused by the fall in pH which results from the carbonation of concrete.

I claim:

1. A method of protecting concrete structures against damage caused by freezing in combination with salts and by chloride-initiated corrosion, characterized by applying a layer of slag cement-concrete to the concrete structure, which may be a newly manufactured structure, an old structure or a newly repaired structure, the slag cement containing between 40 and 80% by weight granulated and ground blast furnace slag.

2. A method according to claim 1, characterized in that the slag cement contains between 60 and 70% by weight granulated and ground blast furnace slag.

* * * * *